(12) United States Patent
Becker et al.

(10) Patent No.: US 11,001,103 B2
(45) Date of Patent: May 11, 2021

(54) TREAD FOR A TIRE

(71) Applicant: The Goodyear Tire & Rubber Company, Akron, OH (US)

(72) Inventors: Marc Becker, Trier (DE); Paolo Taddia, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 367 days.

(21) Appl. No.: 15/884,791

(22) Filed: Jan. 31, 2018

(65) Prior Publication Data
US 2019/0232722 A1  Aug. 1, 2019

(51) Int. Cl.
*B60C 11/12*  (2006.01)
*B60C 11/13*  (2006.01)
(Continued)

(52) U.S. Cl.
CPC ...... *B60C 11/0323* (2013.01); *B60C 11/0309* (2013.01); *B60C 11/042* (2013.01); *B60C 11/125* (2013.01); *B60C 11/1272* (2013.01); *B60C 11/1281* (2013.01); *B60C 11/1353* (2013.01); *B60C 11/1369* (2013.01); *B60C 2011/0355* (2013.01);
(Continued)

(58) Field of Classification Search
CPC . B60C 11/1369; B60C 11/042; B60C 11/045; B60C 11/047; B60C 2011/1338; B60C 11/13
See application file for complete search history.

(56) References Cited

U.S. PATENT DOCUMENTS 2,696,863 A  12/1954 Ewart
4,703,787 A  11/1987 Ghilardi
(Continued)

FOREIGN PATENT DOCUMENTS

EP  3390077 B1  8/2020
JP  3276802  12/1991
(Continued)

OTHER PUBLICATIONS

Machine Translation: JP-08150812-A; Naoi, Toshikatsu; (Year: 2020).*
(Continued)

*Primary Examiner* — Kendra Ly
(74) *Attorney, Agent, or Firm* — Robert N. Lipcsik (57) ABSTRACT

A first tire includes a tread having a circumferential center rib and a circumferential intermediate rib laterally adjacent the center rib, the intermediate rib being separated from the center rib by a first circumferential groove, a second circumferential rib bordering the intermediate rib opposite the first circumferential groove, the tread further including two other circumferential grooves; at least one stiffener element disposed within each of the four circumferential grooves, the stiffener elements having a reduced height relative to a height of the center and intermediate ribs; and the stiffener element having a circumferentially oriented cut extending into an upper surface of the stiffener element toward a bottom of the stiffener element, the cut extending circumferentially through the stiffener element with the cut bounded by opposite laterally inward facing cut sides.

4 Claims, 5 Drawing Sheets

FIG - 5

(51) Int. Cl.
*B60C 11/03* (2006.01)
*B60C 11/04* (2006.01)

(52) U.S. Cl.
CPC ............... *B60C 2011/1338* (2013.01); *B60C 2011/1361* (2013.01); *B60C 2200/06* (2013.01)

(56) References Cited

U.S. PATENT DOCUMENTS

| | | | |
|---|---|---|---|
| 4,703,788 | A | 11/1987 | Kusube |
| 5,385,189 | A | 1/1995 | Aoki et al. |
| 5,795,415 | A | 8/1998 | Campana |
| 7,793,692 | B2 | 9/2010 | Nguyen et al. |
| D674,740 | S | 1/2013 | Mathonet |
| D728,462 | S | 5/2015 | Mathonet |
| D737,756 | S | 9/2015 | Mathonet |
| 9,186,935 | B2 | 11/2015 | Mathonet |
| D770,371 | S | 11/2016 | Mathonet |
| D786,785 | S | 5/2017 | Mathonet |
| 2005/0230020 | A1* | 10/2005 | Miyake ............... B60C 11/12 152/209.19 |
| 2009/0301622 | A1 | 12/2009 | Brown |
| 2013/0061993 | A1* | 3/2013 | Mathonet ........... B60C 11/1369 152/209.22 |

FOREIGN PATENT DOCUMENTS

| | | | | | |
|---|---|---|---|---|---|
| JP | 05155203 | A | * | 6/1993 | ......... B60C 11/0318 |
| JP | 624212 | A | | 2/1994 | |
| JP | 06024212 | A | * | 2/1994 | |
| JP | 07309105 | A | * | 11/1995 | ......... B60C 11/0309 |
| JP | 08150812 | A | * | 6/1996 | ......... B60C 11/0318 |
| JP | 0958217 | A | | 3/1997 | |
| JP | 2002-219909 | | | 8/2002 | |
| JP | 2002219909 | A | * | 8/2002 | |

OTHER PUBLICATIONS

Machine Translation: JP-05155203-A; Hanya, Masahiro; (Year: 2020).*
Machine Translation: JP-06024212-A; Kamimura, Hideaki; (Year: 2020).*
Machine Translation: JP-2002219909-A; Nakamura, Hiroshi; (Year: 2021).*
Machine Translation: JP-07309105-A; Spielvogel, Andreas; (Year: 2021).*
European Search Report for Serial No. 19153614.3 dated Apr. 17, 2019.
European Office Action for Serial No. 19153614.3 dated Apr. 17, 2019.
Chinese Search Report for Serial No. 201910098488.9 dated Sep. 24, 2020.

* cited by examiner

TREAD FOR A TIRE

FIELD OF THE INVENTION

The present invention relates generally to vehicle tires and, more specifically, to a tread pattern for commercial truck applications.

BACKGROUND OF THE INVENTION

Conventional commercial truck tires are required to provide a suitable level of wet and snow performance, while rolling resistance performance and fuel mileage efficiency achieved by the tire are at least maintained. Moreover, it is desired that such tires provide a high level of cornering stiffness and resistance to tread wear in order to prolong the useful life of the tire tread. Accordingly, there is a need for a commercial truck steer tire having a tread pattern that functionally meets such competing objectives, such as snow grip performance, to thereby provide the commercial truck user with acceptable overall tire performance.

SUMMARY OF THE INVENTION

A first tire in accordance with the present invention includes a tread having a circumferential center rib and a circumferential intermediate rib laterally adjacent the center rib, the intermediate rib being separated from the center rib by a first circumferential groove, a second circumferential rib bordering the intermediate rib opposite the first circumferential groove; at least one stiffener element disposed within both the first circumferential groove and the second circumferential groove, the stiffener elements having a reduced height relative to a height of the center and intermediate ribs; and the stiffener element having a circumferentially oriented cut extending into an upper surface of the stiffener element toward a bottom of the stiffener element, the cut extending circumferentially through the stiffener element with the cut bounded by opposite laterally inward facing cut sides.

According to another aspect of the first tire, a first circumferential array of discrete stiffener elements is disposed within the first circumferential groove, with adjacent stiffener elements within the first circumferential array separated by a first circumferential spacing.

According to still another aspect of the first tire, a second circumferential array of discrete stiffener elements is disposed within the second circumferential groove adjacent the center rib, the stiffener elements within the first and the second circumferential arrays both being separated by a first circumferential spacing.

According to yet another aspect of the first tire, each cut extends radially inward from the upper surface of each discrete stiffener element, each cut extending circumferentially through a respective stiffener element and each cut having a radially outward cut segment bounded by opposite inward facing cut sides.

According to still another aspect of the first tire, the cut within each of the discrete stiffener elements within the first array and the second array includes a radially inner cylindrical channel, the channel circumferentially extending through each respective stiffener element and having an axial width dimension greater than an axial width dimension of each cut.

According to yet another aspect of the first tire, each cut has an axial width dimension within a range of 0.0 mm to 2.5 mm.

According to still another aspect of the first tire, each lower channel has a nominal diametric width dimension within a range of 1.0 mm to 6.0 mm.

According to still another aspect of the first tire, the outer surface of each stiffener element is radially offset and recessed from a radially outer surface of the center rib and a radially outer surface of the intermediate rib.

According to yet another aspect of the first tire, the first circumferential groove has a radial depth dimension within a range of 8.0 mm to 22.0 mm, or 12.0 mm to 18.0 mm, and each stiffener element has a radial height within each of the first and second circumferential grooves within a range of 8.0 mm to 22.0 mm, or 11.0 mm to 18.0 mm.

According to still another aspect of the first tire, each stiffener element within the first and second arrays is divided into axially opposed stiffener components by the cut, the cut extending from the upper surface of the stiffener element and having opposite axially extending sides.

According to yet another aspect of the first tire, the axially opposed stiffener element components operatively flex and converge axially from a nominal separation dimension into a deformed orientation when present within a rolling tire footprint to operatively close the cut and the axially opposed stiffener element components operatively flex and diverge axially into a non-deformed orientation when outside a rolling tire footprint and resume the nominal separation dimension.

According to still another aspect of the first tire, the nominal separation width of each cut lies within a range of 0.5 mm to 1.5 mm.

According to yet another aspect of the first tire, each stiffener element has a channel extending circumferentially through each stiffener element, each channel having a diametric width greater than the nominal separation width of each cut.

According to still another aspect of the first tire, the diametric width of the channel lies within a range of 1.0 mm to 5.0 mm.

According to yet another aspect of the first tire, the outer surface of each stiffener element is offset radially inward from a radially outward surface of the center rib and the intermediate rib.

A second tire in accordance with the present invention includes a tire tread having a circumferential center tread region comprising at least a circumferential tread center rib and a laterally adjacent intermediate rib adjacent the center rib, the intermediate rib being separated from the center rib by at least one circumferential tread groove; an array of a first plurality of discrete stiffener element block elements is disposed within the each circumferential tread groove, with adjacent stiffener element elements within the circumferential first array separated by a circumferential spacing; each stiffener element having a circumferentially oriented bisecting cut extending radially inward from an upper surface of the stiffener element toward a bottom of the one stiffener element block element, the bisecting cut extending in a circumferential direction through the stiffener element to form axially opposed stiffener element components.

According to another aspect of the second tire, each stiffener element is divided into axially opposed stiffener element components by the circumferentially oriented bisecting cut, the bisecting cut extending radially from an upper surface of the stiffener element bounded along a radially outward cut segment by axially opposite inward sides.

According to still another aspect of the second tire, the opposed stiffener element components operatively flex and converge axially when present within a rolling tire footprint to operatively close the radially outward cut segment and the opposed stiffener element components operatively flex and diverge axially when outside a rolling tire footprint to resume a nominal separation dimension.

According to yet another aspect of the second tire, the bisecting cut within the stiffener element forms a radially inward channel extending circumferentially through the stiffener element, the channel having a nominal channel width dimension greater than the nominal width dimension of the radially outward bisecting cut.

According to still another aspect of the second tire, the channel is substantially of circular cross-sectional configuration having a nominal diametric width dimension within a range of 2.0 mm to 4.0 mm.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "stiffener elements" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example of, and with reference to, the accompanying drawings, in which.

DETAILED DESCRIPTION OF EXAMPLES OF THE PRESENT INVENTION

With initial reference to FIGS. 1-4, a pneumatic or non-pneumatic tire 10 is provided having a circumferential tread 12 in accordance with the present invention. The tread 12 may include a circumferential center rib 22, two circumferential shoulder ribs 14, 16, and a pair of intermediate circumferential ribs 18, 20 disposed on opposite sides of the center rib 22. An equatorial centerplane CL may divide the tread 12 into two symmetrical halves. A pair of circumferential intermediate grooves 28, 30 may define the center rib 22 and separate the center rib 22 from the laterally adjacent intermediate ribs 18, 20, respectively. A pair of circumferential shoulder grooves 24, 26 may separate, respectively, the intermediate ribs 18, 20 from shoulder ribs 14, 16. A similar tire is disclosed in U.S. Pat. No. 9,186,935, herein incorporated by reference in its entirety.

Figure 1:
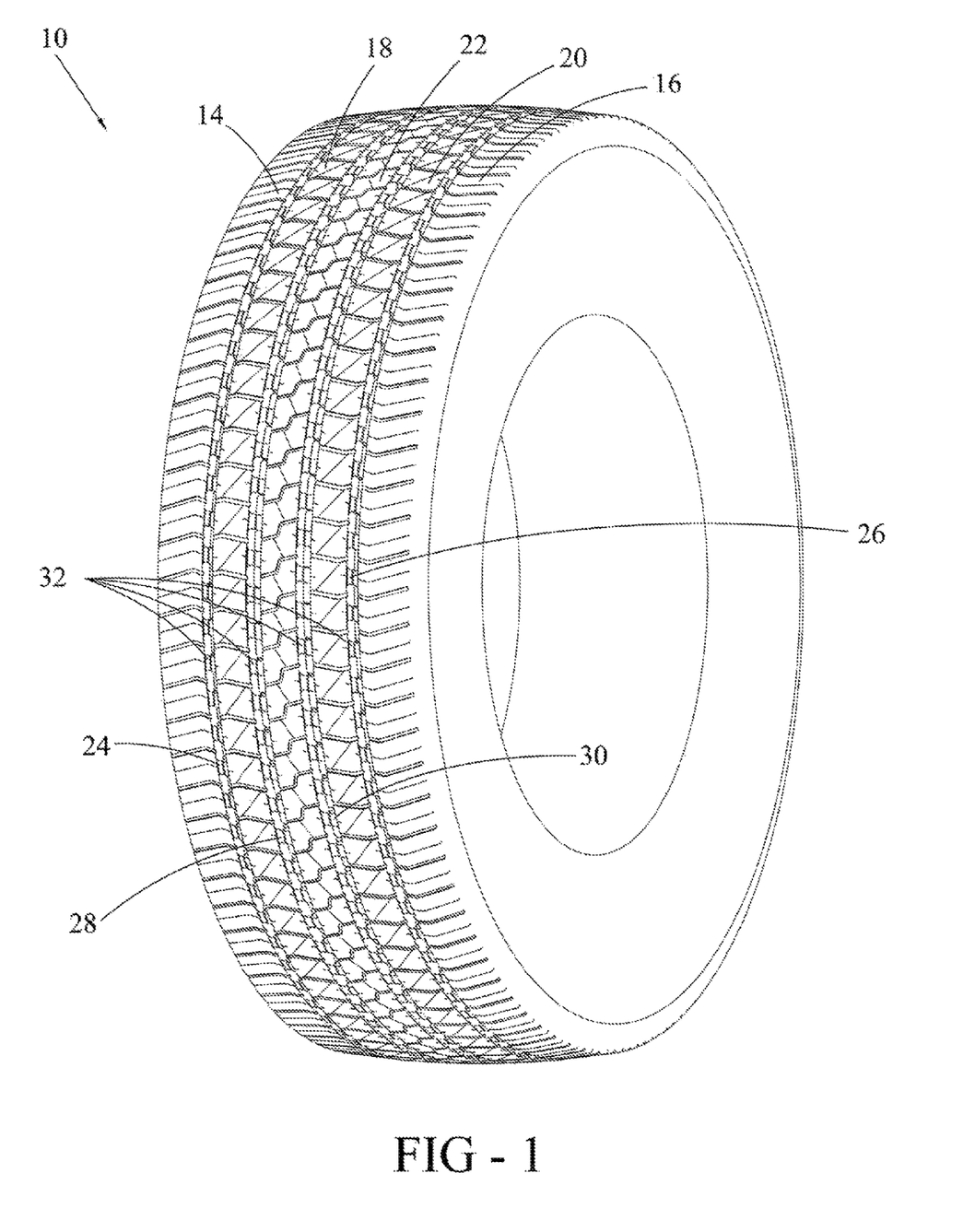
FIG. 1 is a schematic isometric view of a pneumatic tire in accordance with the present invention.
Figure 2:
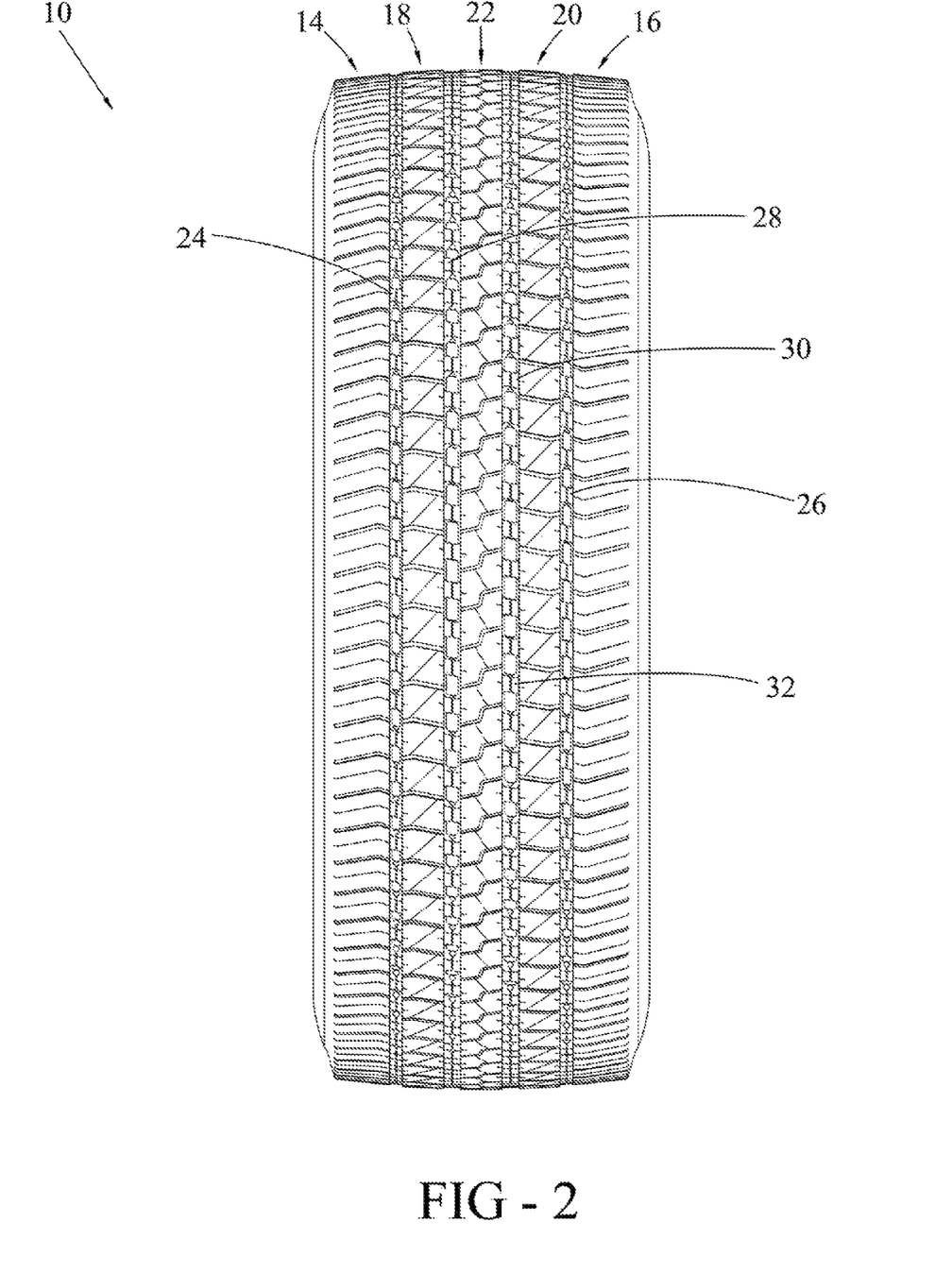
FIG. 2 is a schematic orthogonal plan view of the tread of the pneumatic tire of FIG. 1.
Figure 3:
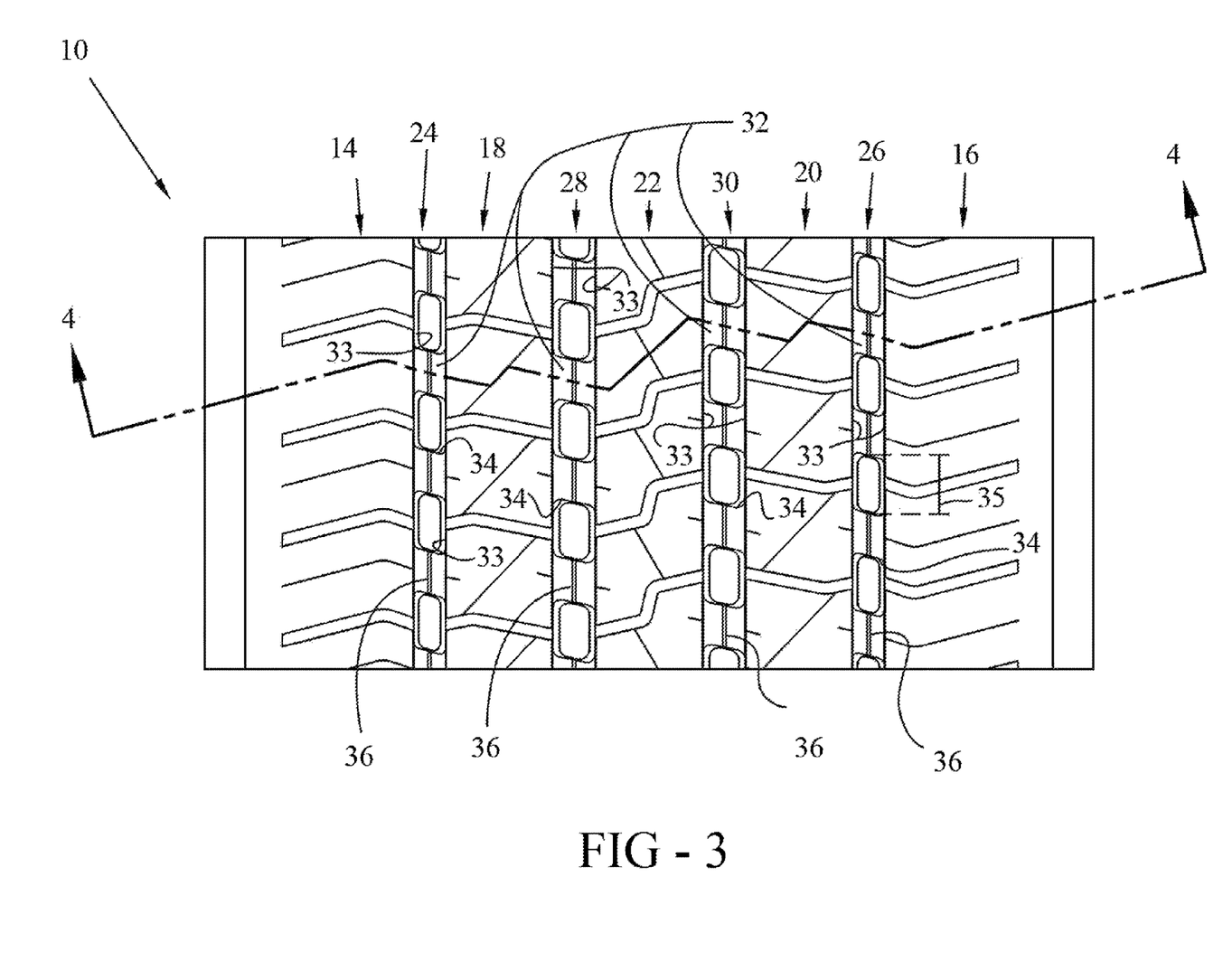
FIG. 3 is a schematic detail view of the tire tread of FIG. 2.
Figure 4:
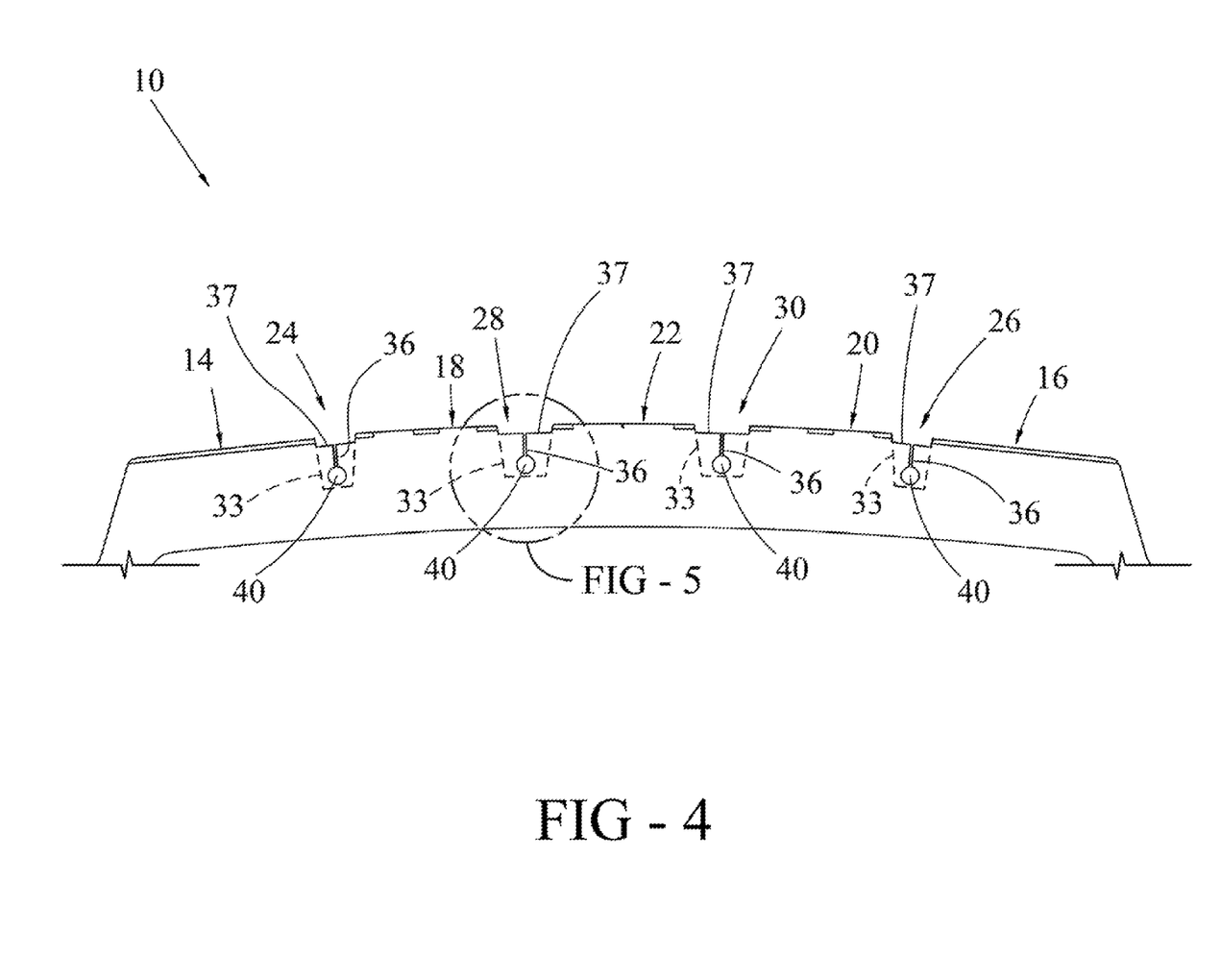
FIG. 4 is schematic section view taken along line 4-4 in FIG. 3.
Figure 5:
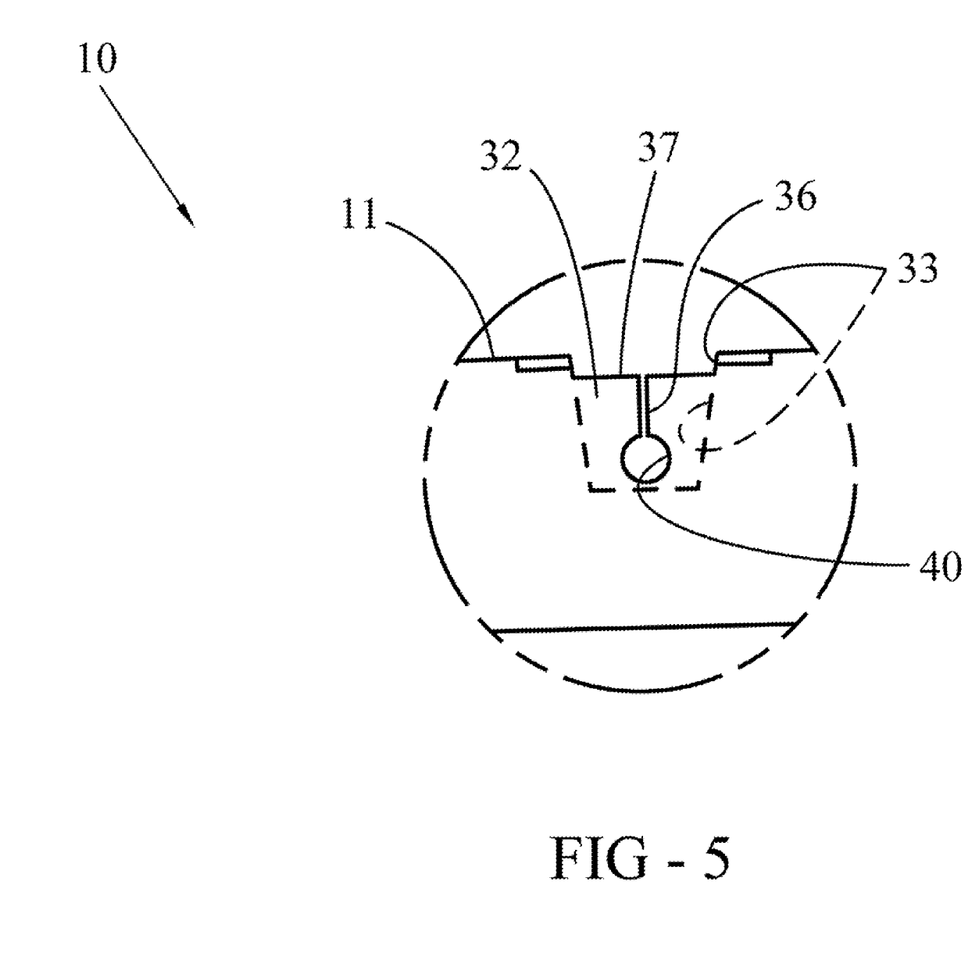
FIG. 5 is a schematic detail of part of the tread of FIG. 4.

The symmetrical pattern of the tread 12 may further include a circumferential array of discrete, spaced apart stiffener elements 32 situated within each of the circumferential grooves 24, 26, 28, 30. The radially outer surface 37 of each stiffener element 32 may be disposed between 1.0 mm and 15.0 mm from an overall radially outer unworn tread surface 11 (FIG. 5). Each of the stiffener elements 32, as best seen in FIGS. 3-5, may be generally quadrilateral and elongate in a circumferential direction, bounded along longitudinal sides 33 of each corresponding circumferential groove 24, 26, 28, 30 by a corresponding circumferential rib 14, 16, 18, 20, 22, and along transverse sides by concave curvilinear sides 34 that extend between corresponding adjacent circumferential ribs 14, 16, 18, 20, 22. The stiffener elements 32 within each circumferential array of stiffener elements 32 in each groove 24, 26, 28, 30 may be spaced apart by a circumferential length 35, which may be within a range of 15.0 mm to 45.0 mm.

Disposed within each stiffener element 32 may be an elongate circumferentially oriented blade cut 36. "Cut" may be used in a general sense as a dividing separation, and not as a reference to the manner of creating/forming the divide. Each cut 36 may divide a respective stiffener element 32 into a pair of opposed stiffener element components. Each cut 36 may have a lateral width between 0.0 mm and 4.0 mm. This width may enable each cut 36 of each stiffener element 32 to close when the cut is disposed within a rolling tire footprint Each cut 36 may extend radially inward to a radially inner circumferential channel 40 disposed at a radially inner end of the cut 36. The inner channel 40 may be generally circular in cross-section, with a diametric width within a range of 2.0 mm to 6.0 mm, and be disposed at an inner base of the stiffener element 32 (FIG. 5). Alternatively, the inner channel 40 may be disposed at a radial location outward of each base of each circumferential groove 24, 26, 28, 30 (not shown). The channel 40 may extend circumferentially through the stiffener element 32 and provide a conduit for air and/or snow and/or rain management, as will be explained below. The cylindrical shape of the inner channels 40 may also reduce crack propagation within the stiffener elements 32 and the overall tread 12.

As stated above, the outer end of each cut 36 may be recessed radially inward from the outer tread surface 11. The circumferential grooves 24, 26, 28, 30 may be recessed and taper inwardly from a first outer width dimension such that each stiffener element 32 may be recessed within a respective groove 24, 26, 28, 30 and have a second inner width less than the first width. The outer surface 37 of each stiffener element 32 may thus have a lateral width less than the first outer width of the circumferential grooves 24, 26, 28, 30.

Operation of the tread 12 in a rolling and loaded tire environment, and in particular the function of the stiffener elements 32, may be understood from a collective consideration of FIGS. 3-5. The tire 10 and tread 12 may have application in a wide range of vehicle uses and types, and, in particular, may be well suited for high mileage steer tires used in commercial trucks.

The stiffener elements 32 of the tread 12 in accordance with the present invention may resist chip and chunk phenomena caused by severe road conditions encountered by the tire 10. The stiffener elements 32 of the tread 12 may reduce irregular wear. The stiffener elements 32 of the tread 12 may increase cornering stiffness and frictional energy may be reduced. As a result, mileage provided by the tread 12 may be increased.

The arrays of stiffener elements 32 further may increase rigidity of the tread 12 thereby increasing cornering stiffness and also enhancing snow and wet performance throughout the life of the tread 12 and tire 10. The stiffener elements 32, functioning as "rigidifiers", may stiffen the tread 12 for better cornering and mileage performance. The stiffener elements 32, recessed within respective grooves 24, 26, 28, 30 may not contact a road surface when the tire 10 is new, but may establish greater contact at the outer surface 17 between the tread and the road surface overall after the tread 12 wears. As the stiffener elements 32 come into contact with the road surface, the edges at the sides 34 may provide additional edges within the footprint area thereby enhancing snow and wet traction. The channel 40 of each stiffener element 32 may define an air and/or water and/or snow conduit for directing air and/or water and/or snow through the stiffener elements. Allowing air to pass through the stiffener elements 32 may eliminate trapped air and thereby reduce the noise level produced by the tread 12. Also, by allowing the passage of water through the channels 40, potential aquaplaning may be mitigated.

The addition of the stiffener elements 32 may increase lateral stiffness of the overall tread 12 without impacting the circumferential stiffness of the overall tread. The cuts 36 may extend through the stiffener elements 32 from the outer surface 37 to the channel 40 and bisect the stiffener elements into opposite block components in the circumferential direction (FIGS. 1-5). The stiffener elements 32 may thus be nominally open by the width of the cuts 36 when the stiffener elements are outside the rolling tire footprint. When the stiffener elements 32 enter the rolling tire footprint, the cuts 36 may close in the lateral or axial direction, bringing the two component parts of the stiffener elements together in touching relationship. As a result, the lateral stiffness of the tread 12 within the rolling tire footprint may be increased when the stiffener element is within the rolling tire footprint thereby enhancing cornering stiffness and reducing frictional energy and/or hysteresis. When a stiffener element 32 leaves the rolling tire footprint, the stiffener element may separate in the lateral or axial direction and the corresponding cut 36 may re-open to its original width. The stiffener elements 32 may thus improve mileage performance of the tire 10 by enhancing stiffness and reducing treadwear from lateral loads on the tread 12.

As the tread 12 wears through use, the stiffener elements 32 may become road contacting elements with the edges of the stiffener elements defining additional contact edges for enhancing traction of the tread. From the foregoing, it will be appreciated that the tread 12 is durable and provides improved performance characteristics. The tread 12, configured with the circumferential spaced apart arrays of discrete stiffener elements 32 within at least one of the circumferential tread grooves 24 26, 28, 30, may alter the stiffness characteristics of the tread without compromising the wear and circumferential resistance characteristics of the tread.

Each stiffener element 32 may have a circumferentially oriented bisecting cut 36 which divides the stiffener element into opposed stiffener components. The opposed stiffener components accordingly may operatively flex and converge and/or close laterally or axially when present within a rolling tire footprint. The stiffener elements 32, when present within the rolling tire footprint, thus may stiffen the overall tread 12 and thereby enhance cornering, wear, and handling performance of the tread. The opposed stiffener components may resume a nominal separation dimension or width when outside a rolling tire footprint.

The bisecting cut 36 within each stiffener element 32 may further form, at a radially inward end, the large diameter fluid-conducting channel 40 which may extend circumferentially through the stiffener element to allow the passage of air/fluid/snow along the circumferential groove 24, 26, 28, 30 in which the stiffener element is situated. The array of stiffener elements 32 accordingly do not obstruct the functional performance of the circumferential grooves 24, 26, 28, 30 in which the stiffener elements are situated, and fluid, such as rain or snow melt, may traverse the circumferential grooves unobstructed by the array of stiffener elements 32. The tread 12 may thus provide high mileage and durability.

Variations in the present invention are possible in light of the description of examples of it provided herein. While certain representative embodiments and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed:

1. A tire comprising:
   a tread having a circumferential center rib and a circumferential intermediate rib laterally adjacent the center rib, the intermediate rib being separated from the center rib by a first circumferential groove, a second circumferential groove bordering the intermediate rib opposite the first circumferential groove, the tread further including two other circumferential grooves;
   stiffener elements are disposed within each of the four circumferential grooves, each stiffener element having a reduced height relative to a height of the center and intermediate ribs; and
   each stiffener element having a circumferentially oriented cut extending into an upper surface of the respective stiffener element toward a bottom of the same stiffener element, the cut extending circumferentially through the respective stiffener element with the cut bounded by opposite laterally inward facing cut sides, the cut within each stiffener element including a radially inner cylindrical channel, the channel circumferentially extending through the respective stiffener element and having an axial width dimension greater than an axial width dimension of each cut, the channel having a circular cross-sectional configuration with a nominal diametric width dimension within a range of 2.0 mm to 4.0 mm, the channel being disposed at a radially inner base of the respective stiffener element, each circumferential groove comprises adjacent stiffener elements separated by a circumferential spacing that is within a range of 15.0 mm to 45.0 mm,
   axially opposed stiffener element components operatively flexing and converging axially from a nominal separation dimension into a deformed orientation when present within a rolling tire footprint to operatively close the respective cut and the axially opposed stiffener element components operatively flexing and diverging axially into a non-deformed orientation when outside a rolling tire footprint and resuming the nominal separation dimension,
   the stiffener elements thereby increasing an overall lateral stiffness of the tread relative to a tread without stiffener elements, without impacting an overall circumferential stiffness of the tread, relative to the tread without stiffener elements.

2. The tire as set forth in claim 1 wherein each cut has an axial width dimension within a range of 0.0 mm to 2.5 mm.

3. The tire as set forth in claim 1 wherein the nominal separation width of each cut lies within a range of 0.5 mm to 1.5 mm.

4. A tire comprising:
   a tire tread having a circumferential center tread region comprising at least a circumferential tread center rib and a laterally adjacent intermediate rib adjacent the center rib, the intermediate rib being separated from the center rib by at least one circumferential groove, the tread further including two other circumferential grooves; and
   an array of a first plurality of discrete stiffener elements disposed within each circumferential tread groove, with adjacent stiffener elements within the circumferential first array separated by a circumferential spacing that is within a range of 15.0 mm to 45.0 mm; where
   each stiffener element having a circumferentially oriented bisecting cut extending radially inward from an upper surface of the respective stiffener element toward a bottom of the stiffener element, the bisecting cut extending in a circumferential direction through the stiffener element to form axially opposed stiffener element components, each bisecting cut extending circumferentially through the stiffener element with the bisecting cut bounded by opposite laterally inward facing cut sides, the bisecting cut within each stiffener element including a radially inner cylindrical channel, the channel circumferentially extending through each stiffener element and having an axial width dimension greater than an axial width dimension of each bisecting cut, the channel having a circular cross-sectional configuration with a nominal diametric width dimension within a range of 2.0 mm to 4.0 mm, the channel being disposed at a radially inner base of the respective stiffener element,
   the axially opposed stiffener element components operatively flexing and converging axially from a nominal separation dimension into a deformed orientation when present within a rolling tire footprint to operatively close the respective cut and the axially opposed stiffener element components operatively flexing and diverging axially into a non-deformed orientation when outside a rolling tire footprint and resuming the nominal separation dimension,
   the stiffener elements thereby increasing an overall lateral stiffness of the tire tread relative to a tread without stiffener elements, without impacting an overall circumferential stiffness of the tire tread, relative to a tread without stiffener elements.

* * * * *